United States Patent [19]

Almasi

[11] 3,750,154

[45] July 31, 1973

[54] BUBBLE DOMAIN CHIP ARRANGEMENT

[75] Inventor: George S. Almasi, Katonah, N.J.

[73] Assignee: International Business Machines Corporation, Armonk, N.Y.

[22] Filed: May 1, 1972

[21] Appl. No.: 249,622

[52] U.S. Cl. ...................... 340/174 TF, 340/174 SR

[51] Int. Cl. ........................ G11c 11/14, G11c 19/00

[58] Field of Search ................. 340/174 TF, 174 SR

[56] References Cited

OTHER PUBLICATIONS

Scientific American, "Magnetic Bubbles" by Bobeck et al., 6/71, pages 78–90.

IBM Technical Disclosure Bulletin "Bubble Memory Package Via Eggcrate" by Uberbacker, Vol. 14, No. 11, 4/72, p. 3378, 3379.

*Primary Examiner*—Stanley M. Urynowicz, Jr.
*Attorney*—Jackson E. Stanland et al.

[57] ABSTRACT

A space displacement arrangement of magnetic domain chips with respect to each other, which allows packaging with a minimum number of memory interconnections and low operating power. In addition, reduction of the number of preamplifiers and the number of sensors is achieved. Each chip contains bubble domain devices thereon, and provides a complete bubble domain memory system. Spatially rotating the chips with respect to one another means that the same reorienting magnetic drive field will have a time displaced effect on each of the chips. That is, each chip will see the reorienting drive field at a different time. In this manner, multiplexing on a chip-to-chip basis is achieved. The chips can be arranged so that no interconnection cross-overs result, even though they are rotationally displaced with respect to one another.

22 Claims, 4 Drawing Figures

BUBBLE DOMAIN CHIP ARRANGEMENT

BACKGROUND OF THE INVENTION

The invention described herein was made in the performance of work under a NASA contract and is subject to the provisions of Section 305 of the National Aeronautics and Space Act of 1958, Public Law 85-568 (72 STAT 435; 42 U.S.C. 2457).

FIELD OF THE INVENTION

This invention relates to a chip layout for magnetic bubble domain systems in order to achieve low operating power, minimum memory interconnections, and a reduced number of components per grouping of memory chips.

DESCRIPTION OF THE PRIOR ART

Complete memory systems using magnetic bubble domains are known in the art, as can be seen by referring to U.S. Pat. Nos. 3,701,125 and 3,689,902. In these memory systems, magnetic bubble domains are generated and stored in selected locations in a memory sheet, readout of information from selected storage locations is achieved, and it is also possible to selectively remove information and provide new information to the storage location.

For purposes of explanation, each magnetic sheet together with its associated bubble domain devices for provision of domain generation, domain storage, domain sensing, domain decoding, and domain clearing, etc. will be termed a memory chip. The drivers for providing current pulses to the decoders, clear means, etc. are not included in a "memory chip," as defined here. The memory chip does not include means for providing a reorienting, in-plane magnetic field for moving domains in the magnetic sheet, nor does it generally include means for providing a magnetic bias field normal to the plane of the magnetic sheet for stabilizing the size of domains in the sheet. However, in those cases where the bias field is provided by a magnetic layer which is in exchange-coupled relationship to the magnetic sheet, such arrangement will be included within the definition of a memory chip.

A memory module is comprised of a plurality of memory chips and includes means for providing the magnetic drive field which is used to move domains within the magnetic sheet of each magnetic chip. However, a memory module generally does not include means for providing the magnetic bias field normal to the magnetic chips.

A memory page is defined as the smallest complete memory unit. That is, the memory page comprises a plurality of memory chips having means to provide the magnetic drive field and means to provide a magnetic bias field normal to the memory chips.

Provision of a complete memory unit involves problems of locating the various memory chips on a printed circuit board or some other support medium in such a way that the number of memory interconnections is reduced and the operating power is minimal. In addition, it is desired to use a minimum number of sense amplifiers and sensing elements. For instance, a simple straight forward approach for organizing a complete memory unit is to divide the total memory capacity by the number of data bits per memory word and to let the resulting storage capacity define the basic memory module. If each bit of a memory word is assigned to a different module, then only one sense amplifier per module is required. This resulting bit-per-module system is simple and has a reasonable number of interconnections per chip, module, and page.

The main problem with the bit-per-module system is that all bubble domains must be circulated all of the time, which results in a large power dissipation. The power dissipation can be reduced by circulating only part of the bubble domains at a time. For instance, it may be convenient to assemble a module on a bit-per-chip basis, rather than on a bit-per-module basis where the module is comprised of a number of memory chips but only one bit of each memory word is stored on one module. Doing this will require that only a limited number of modules at a time will require a rotating drive field for provision of access to the data bits in each word. However, this approach requires more check bits per word than the bit-per-module approach. Balanced against this is the fact that the operating power is reduced significantly. Still further, the interconnections per module and per page increase drastically with this approach, which leads to other problems.

To provide a memory organization where the number of interconnections per module is low, where operating power is low, and where single sense amplifiers and sensing units can be used for a plurality of memory chips, a space rotation arrangement for the memory chips is proposed. That is, each memory chip in a group of memory chips is rotationally displaced with respect to other chips within the group. As an example, consider four memory chips in each group which are rotated by 90° with respect to one another (tetrad arrangment). The memory chips and cells are identical, so this space quadrature results in a time quadrature for the memory chip. That is, when chip 1 sees a particular magnetic drive field at 0°, chip 2 sees that same drive field at 90°, chip 3 sees that same drive field at 180°, and chip 4 sees the same drive field at 270°. This approach takes advantage of the fact that the control currents for each memory chip as well as the sense signal for each chip can be on for $\leq$ ¼ of the rotation cycle of the magnetic drive field. Consequently, at any one given time, only one of the four chips in the quadrature arrangement has a bubble domain opposite its sensor, etc. Four-way multiplexing on the sense and control lines results while at the same time preserving the feature of low operating power.

The following Table I shows a comparison of the various memory organizations described and more distinctly points out the memory interconnection improvement resulting from the rotation displacement layout proposed herein.

TABLE I: MEMORY INTERCONNECTION COUNTS

| | Bit-Per MOdule | Bit-Per-chip, Non-tetrad | Bit-Per-Chip, Tetrad |
|---|---|---|---|
| Per Chip | 28 | 20 | 20 |
| Per Module | 56 | 110 | 50 |
| Per Page | 68 | 411 | 123 |

Accordingly, it is primary object of this invention to provide a complete bubble domain memory unit which requires a minimum number of memory interconnections.

It is another object of this invention to provide a magnetic bubble domain memory unit having a magnetic chip layout and organization which requires low operating power.

It is a further object of this invention to provide a memory chip layout for a magnetic bubble domain system which requires a minimum number of sensing components.

SUMMARY OF THE INVENTION

Bubble domain memory chips having bubble domain devices thereon are arranged so that all chips in a group are rotationally displaced with respect to other chips in the same group. The bubble domain devices on each chip generally provide the same function as do devices on other chips, but the functions can be different. It is only important that the effect of a common reorienting magnetic field in the plane of the chips be different for each chip at each instant of time. That is, a particular effect of the in-plane magnetic field on each chip occurs at different times for each chip.

As an example, four magnetic chips are arranged in a tetrad layout, so that each memory chip experiences the same effect from the reorienting magnetic drive field at a time related to the time it takes the drive field to rotate 90°. In this case, each magnetic chip in the tetrad arrangement is rotated 90° with respect to the adjacent chip in the arrangement. Of course, there can be more chips in each arrangement, where the various chips of the arrangement are rotated less than or more than 90° with respect to one another.

These and other objects, features, and advantages of the invention will be more apparent from the following more particular description of the preferred embodiments.

DETAILED DESCRIPTION OF THE PREFERRED EMBODIMENTS

Figure 1:
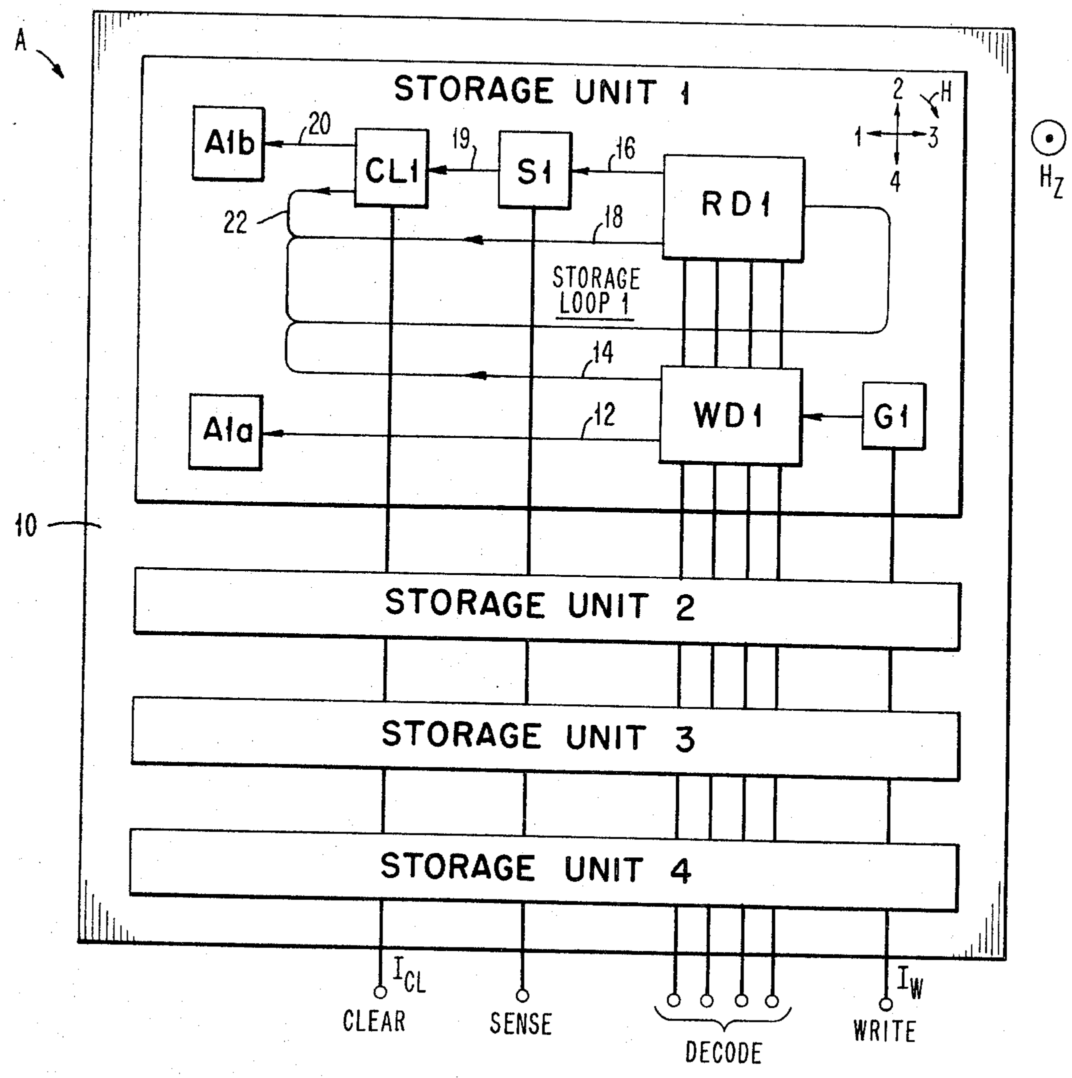
FIG. 1 shows a magnetic memory chip which will provide a memory function.

FIG. 1 shows a memory chip, herein designated A, which provides a complete memory function. That is, the memory chip A is comprised of a magnetic sheet 10 (a garnet film, for instance) on which is located a plurality of storage units. In this figure, domain propagation paths are indicated by arrows while conductors are indicated by heavy lines without arrows. In this case, four storage units are shown although it should be understood that any number can be provided. Each storage unit has the ability of generating information represented as the presence and absence of magnetic bubble domains. In addition, each storage unit has provision for write and read decoding, storage of the bubble domains, sensing of the bubble domains, and selective removal of information from the storage means.

In more detail, each storage unit is comprised of the functional components shown in storage unit 1. This particular unit will now be described to indicate the functions which can be provided on magnetic sheet 10. For a more complete description of this type of memory, reference is made to aforementioned U.S. Pat. Nos. 3,689,902 and 3,701,125.

In storage unit 1, domains are produced by domain generator G1 and are passed to write decoder WD1 or are collapsed by the magnetic field due to write current $I_W$. Depending upon the current pulses to write decoder WD1, domains are either sent to annihilator A1a via path 12, or are sent to storage loop 1 via path 14. After traveling in storage loop 1, the domains pass through read decoder RD1. Depending upon the decode currents provided, domains are either propagated to sensor S1 via path 16, or are returned to storage loop 1 via path 18. The sensor is any known type of magnetic bubble domain sensor, and is preferably a magnetoresistive sensor. In this type of sensor, the change in resistance of the sensing element is manifested as a current or voltage change which is easily detected and sent to a utilization means, as is well known in the art. For more detail of this type of sensor, reference is made to U.S. Pat. No. 3,691,540.

After being sensed, domains are propagated to clear means CL1 via path 19. The clear means is used to selectively remove information from storage loop 1 in accordance with the current $I_{CL}$ provided through this means. This type of switch is described in more detail in copending application Ser. No. 249,026, filed May 1, 1972 and assigned to the present assignee. Depending upon the current $I_{CL}$, domains leave clear means CL1 and propagate to annihilator A1*b* via path 20 or are returned to storage loop 1 via path 22.

The memory storage unit shown in FIG. 1 uses decoders for selective writing and reading of information from the various storage loops. In this type of arrangement, information is entered into only one storage loop at a time, depending upon the decoder current inputs. In the same fashion, information is read from only one storage loop at a time depending upon the decoder current inputs. The entire circuitry shown in FIG. 1, including the magnetic sheet 10 and the propagation overlay elements provided in each storage unit, comprises a magnetic memory chip which is designated A.

Figure 2:
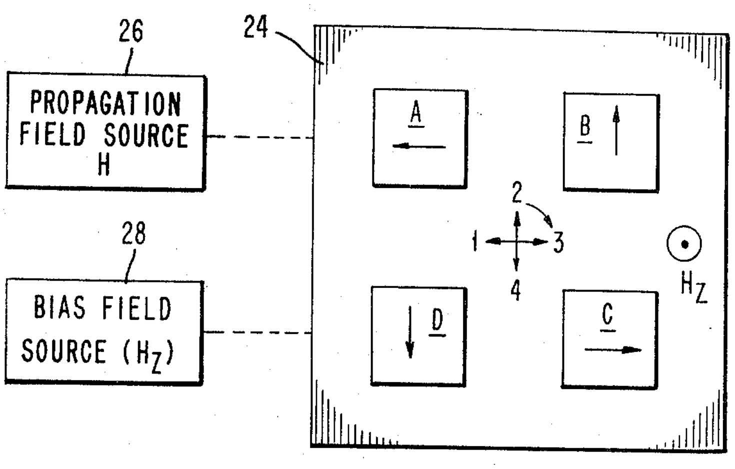
FIG. 2 shows a tetrad arrangement of magnetic chips on a printed circuit board, in combination with a common rotating drive field H.

FIG. 2 shows a layout of memory chips such as is shown in FIG. 1. In this diagram, four memory chips A, B, C, and D are arranged in a single grouping on a suitable support 24, which could be a printed circuit board, for instance. In this case, a reorienting magnetic field H in the plane of each magnetic chip A, . . . ,D is provided by propagation field source 26. A magnetic bias field $H_z$ normal to each memory chip is provided by bias field source 28.

Arrows are shown in each of the magnetic memory chips A, B, C, D, to indicate the spatial rotation of each chip in the group with respect to one another. In FIG. 2, four magnetic chips are shown and these are arranged with 90° rotations from one chip to the next. For instance, chip B is rotated 90° clockwise with respect to chip A.

The tetrad arrangement of magnetic chips in FIG. 2 allows the rotating magnetic field H to have the same effect on each memory chip at different times. It will affect chip A to provide some function when it is in direction 1 and will affect chip B to provide the same function when it is in direction 2, etc. This means that the space quadrature provided by this layout of chips A-D leads to a time quadrature for the realization of each function in the magnetic chips. In the case of four memory chips spatially rotated 90° with respect to one another, a four-way multiplexing of the sense and control lines for these chips is obtained by this arrangement. Therefore, the number of interconnections per arrangement is reduced and low operating power will result. As will be seen later, it is possible to achieve this space quadrature without requiring cross-overs of conductors anywhere on support 24.

Figure 3:
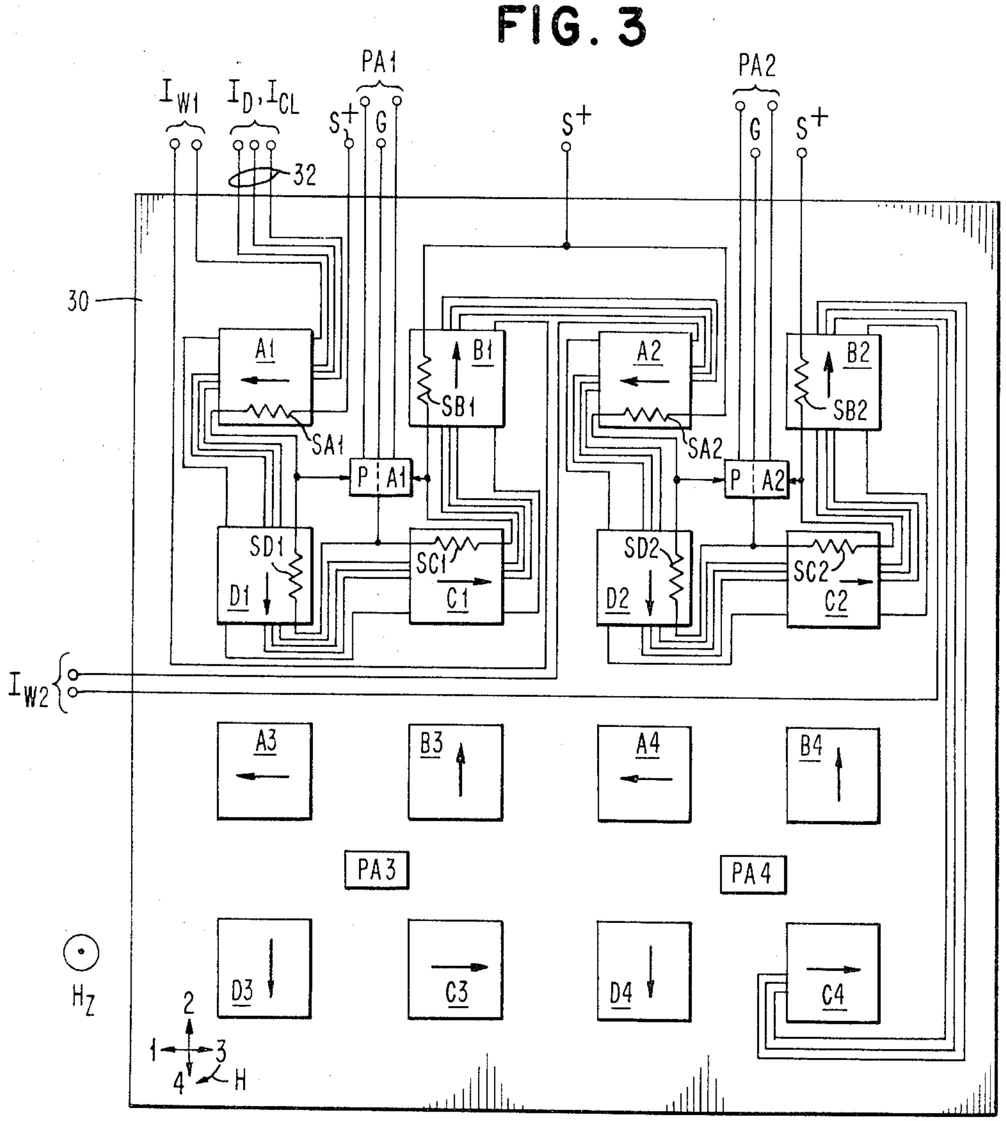
FIG. 3 shows a memory module comprising four groups of magnetic chips, each group of which is in a tetrad arrangement as shown in FIG. 2.

FIG. 3 shows a memory module comprising four groups of magnetic memory chips, each of which is arranged in a tetrad arrangement. The chips in each group are given the same letter designation A, B, C, D, as is used in FIG. 2 and in addition are given a number indicating the group to which they belong. For instance, magnetic chip A1 is the first magnetic chip in group 1, while magnetic chip C2 is the third magnetic chip in group 2.

In FIG. 3, a single reorienting, in-plane drive field H is shown. This drive field can be produced by current-carrying coils surrounding the module support board 30, as is well known. If desired, a magnetic drive field H can be provided for each group of magnetic chips A, . . . ,D. Also shown is a magnetic bias field $H_z$ which is substantially normal to the planes of the various magnetic chips for stabilizing the size of the domains in each chip. The source of the magnetic bias field $H_z$ and the magnetic drive H are not shown in this drawing, for ease of illustration.

FIG. 3 illustrates that no cross-over connections for any of the electrical conductors is required when the magnetic chips are arranged in groups of four, each group having a tetrad arrangement wherein the magnetic chips are displaced 90° with respect to one another. In the particular wiring layout illustrated in FIG. 3, currents $I_{W1}$, $I_{W2}$, . . . , are provided to separate groups of memory chips. In this drawing, conductors for currents $I_{W1}$ and $I_{W2}$ are shown, it being understood that similar conductors would be used for groups 3 and 4.

The conductors collectively numbered 32 supply the decode currents $I_D$ and clear current $I_{CL}$ to the various memory chips. In the particular arrangement illustrated, conductors 32 thread each of the memory chips on the module board 30, although conductors 32 are shown going through only groups 1 and 2 and memory chip C4 of group 4, for ease of illustration.

Each memory chip contains domain sensors SA1, SB1, SC1, SD1, SA2, . . . ,SC4, SD4. Preferably these sensors are magnetoresistive sensing elements and are shown as "resistive-type" elements in FIG. 3. Depending on the organization on each memory chip, each sensor SA1, etc. can be a single sensor, or a series connection of more than one sensor. As will be noted, the sensing elements are connected in a bridge circuit arrangement, and the output signal is achieved on the conductor lines labelled S. Further, a ground connection G is provided to the pairs of sensing elements. In a known manner, sensing current flows through each of the sensors when a magnetic bubble domain is to be sensed. The presence of a doamin in flux-coupling proximity to the sensor causes a change in resistance of the sensing element which is detected as a current or voltage change. Use of sensors in a bridge-type arrangement leads to better noise cancellation.

Associated with the sensing elements in each group of memory chips is the preamplifier PA1, PA2, PA3, PA4. Power to the preamplifiers is provided by the conductors having the legends PA1, PA2, . . . , at their terminals. Thus, in this tetrad arrangement, the preamplifiers are placed centrally in each group in close proximity to each memory chip to minimize pick-up noise. The preamplifiers act as the null detectors in the bridge circuit arrangement shown here. As will be noted, a bridge element consists of a series combination of all the sensors on each magnetic chip.

For the memory module of FIG. 3, various current drivers are not shown. However, these are conventionally used drivers and are illustrated in the aforementioned U.S. Pat. Nos. 3,701,125 and 3,689,902.

The advantage of this tetrad arrangement is not just in sharing of the preamplifiers, but in the total number of connections per module. For example, using a memory module having 16 memory chips, and a "bit per chip" design, a memory word consisting of 64 data bits plus 32 check bits can be stored on 6 modules. If each chip has a storage capacity of $10^5$ bits, a page of memory can hold $10^5$ memory words on 6 of its modules, the other two modules being used for spares to increase the reliability (see aforementioned application Ser. No. 249,026. The following Table II is used to illustrate the module interconnection count for the module of FIG. 3, assuming a bit-per-chip organization. As will be apparent from this table, the number of interconnections per module is significantly reduced over non-tetrad arrangements.

TABLE II

MODULE (FIG. 3) INTERCONNECTION COUNT (Bit-Per-Chip Organization)

| Connection | Tetrad (Multiplexing | Non-tetrad (No Multiplexing) |
|---|---|---|
| Clear & Decode Lines In | 8 | 8 |
| Clear & Decode Lines Out | 8 | 8 |
| Write Lines In | 4 | 16 |
| Write Lines Out | 4 | 16 |
| Preamp Output (double-ended) | 8 | 32 |
| Sensor (+Supply) | 6 | 6 |
| Sensor (−Supply) | 4 | 4 |
| Preamp Power | 4 | 16 |
| X Coil (field H) | 2 | 2 |
| Y Coil (field H) | 2 | 2 |
| TOTAL | 50 | 110 |

The advantage of the tetrad approach is even more pronounced when page connections are counted, as will be shown in Table III. In the particular case illustrated, a page will hold $10^5$ memory words on 6 of its modules. Sixteen pages are required for a $10^8$ bit memory, since each module has 16 chips. A memory word consists of 64 data bits plus 32 check bits. The memory can be operated in a mode where the rotating propagation field power is applied to only one page at a time, leading to a substantial saving on total memory power dissipation. Since the pages are independent submemories with their own bias field source, replacement is simple and pages can be moved back and forth between shelf storage, if desired.

TABLE III

PAGE INTERCONNECTION COUNT (Bit-Per-Chip Organization)

| Connection | Tetrad | Non-Tetrad |
|---|---|---|
| Clear & Decode Lines In | 8 | 8 |

| | | |
|---|---|---|
| Write Lines In | 32 | 128 |
| Preamp Output (single-ended) | 32 | 128 |
| Sensor Bridge Const. Current Supplies | 32 | 128 |
| X + Y Coils | 16 | 16 |
| +V, −V (Preamp. pwr.) | 2 | 2 |
| Ground | 1 | 1 |
| TOTAL | 123 | 411 |

Figure 4:
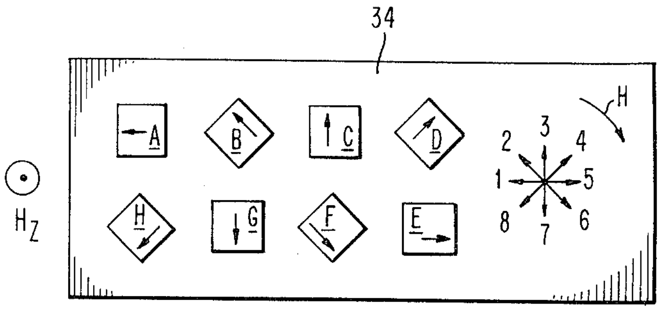
FIG. 4 shows an octad arrangement of magnetic chips on a printed circuit board in which the magnetic chips are rotated 45° with respect to one another.

To illustrate the flexibility of the concept of memory interconnection reduction using rotational displacement of memory chips with respect to one another, FIG. 4 shows a situation in which 8 memory chips A, B, . . . ,H, are located on a support board 34. In this case, each chip is rotated by 45° to be along one direction of the magnetic drive field H, so that 8 positions of rotating drive field H are used. For instance, chip A sees the propagation field H when it is in direction 1, while chip B sees the same effect of the propagation field H when the field is at direction 2.

In FIG. 4, an eight-way multiplexing is achieved, and the sense signals and other control signals will last for only about one-eighth of the total rotation time of the drive field H. That is, the current control switches used to accomplish the write, decode, and clear functions in each memory chip can all be made to operate with control currents which are on for only about one-eighth of the rotational cycle of magnetic field H. All magnetic chips A, . . . ,H are generally identical, although this may not be so. It is only important that they be given rotational displacements with respect to one another so that a drive field H will have the same effect on each magnetic chip at different times.

What has been described is a memory chip organization having significantly reduced operating power, memory interconnections, and associated hardware. This concept allows multiplexing to occur on a chip-to-chip basis, but goes beyond that in reducing significantly the number of interconnections required per memory module and per memory page. In addition, this advantageous arrangement of memory chips does not introduce other fabrication problems, such as those which would result when conductors have to cross over one another over in an entire memory module or page.

What is claimed is:

1. A magnetic bubble domain memory, comprising:
a plurality of magnetic chips each of which includes a magnetic sheet in which said bubble domains exist and overlay elements adjacent thereto for manipulation of domains in said sheet in accordance with the orientation of a magnetic field substantially in the plane of said magnetic sheet, said chips being rotationally oriented along a plurality of different directions defined by said magnetic field,
drive field means for providing said magnetic field substantially in the plane of said magnetic sheet for manipulation of domains in the magnetic sheet of each magnetic chip in accordance with the orientation of said magnetic field.

2. The memory in claim 1, wherein said magnetic field is a rotating magnetic field.

3. The memory of claim 2, wherein there are four of said magnetic chips arranged so that each is rotated approximately 90° with respect to a different one of the remaining chips in the group of four chips.

4. The memory of claim 3, where said overlay elements are comprised of a magnetically soft material.

5. The memory of calim 4, where said material is permalloy.

6. The memory of claim 1, where said magnetic chips are identical to one another.

7. The memory of claim 1, further including means for producing a magnetic bias field substantially normal to the plane of said magnetic sheets.

8. A memory unit using magnetic bubble domains, comprising:
a plurality of magnetic memory chips, each of which includes:
a magnetic sheet in which said domains exist,
storage means adjacent said sheet for storage of said domains within said sheet,
domain input means for providing patterns of said domains,
sensing means for detection of said domains in said sheet,
magnetic drive field means for providing a reorienting magnetic field substantially in the plane of each said magnetic sheet,
wherein said magnetic chips are spatially rotated with respect to one another, each chip being oriented along a different orientation of said magnetic drive field.

9. The memory unit of claim 8, where said storage means and said domain generation means are comprised of magnetically soft materials.

10. The unit of claim 8, further including bias field means for producing a magnetic bias field substantially normal to said magnetic sheet.

11. The unit of claim 8, where said magnetic chips are identical to one another.

12. The unit of claim 8, where these are four magnetic chips oriented in a tetrad arrangement, said chips being rotated along four mutually perpendicular directions of said reorienting magnetic field.

13. A memory unit using magnetic bubble domains, comprising:
a plurality of magnetic chips comprising a group of said chips, each of which includes a magnetic sheet in which said domains exist, and magnetically soft elements adjacent said magnetic sheet for manipulation of said domains in said sheet in accordance with the orientation of a magnetic field substantially in the plane of said magnetic sheet, said elements being oriented identically in each said magnetic chip,
wherein each said chip is rotationally displaced with respect to other chips in said group, and
magnetic field means for producing said reorienting magnetic field substantially in the plane of said magnetic sheets.

14. The unit of claim 13, wherein all magnetic sheets are substantially in the same plane.

15. The unit of claim 13, wherein all magnetic chips are identical.

16. The unit of claim 13, further including bias field means for producing a magnetic bias field substantially normal to said magnetic sheets.

17. The unit of claim 13, where there are a plurality of said groups of magnetic chips.

18. The unit of claim 13, further including a single sense amplifier associated with all of said chips in each group.

19. The unit of claim 13, where said elements are comprised of permalloy.

20. The unit of claim 13, wherein there are four magnetic chips in each said group, each magnetic chip being displaced along a direction of said reorienting magnetic field 90° rotationally displaced from at least one other direction of said reorienting magnetic field.

21. The unit of claim 13, further including drive circuits providing electrical inputs to a plurality of magnetic chips, said drive circuits being shared among said chips.

22. The unit of claim 21, further including a sense amplifier associated with said plurality of chips, said sense amplifier and said drive circuits being time multiplexed in operation with said magnetic chips.

* * * * *